United States Patent
Kwak et al.

(10) Patent No.: US 10,405,238 B2
(45) Date of Patent: Sep. 3, 2019

(54) METHOD AND APPARATUS FOR MANAGING BUFFER IN WIRELESS COMMUNICATION SYSTEM

(71) Applicant: Samsung Electronics Co., Ltd., Suwon-si, Gyeonggi-do (KR)

(72) Inventors: Dongho Kwak, Suwon-si (KR); Dongsook Kim, Suwon-si (KR); Hanseok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 15/161,830

(22) Filed: May 23, 2016

(65) Prior Publication Data

US 2016/0345207 A1  Nov. 24, 2016

(30) Foreign Application Priority Data

May 22, 2015  (KR) .................. 10-2015-0072089

(51) Int. Cl.
| | |
|---|---|
| *H04L 12/835* | (2013.01) |
| *H04W 28/14* | (2009.01) |
| *H04L 5/00* | (2006.01) |
| *H04L 12/841* | (2013.01) |

(52) U.S. Cl.
CPC .......... *H04W 28/14* (2013.01); *H04L 5/0055* (2013.01); *H04L 47/283* (2013.01); *H04L 47/30* (2013.01)

(58) Field of Classification Search
CPC ..... H04L 69/16; H04L 47/193; H04L 69/166; H04L 47/10; H04L 69/163; H04L 47/27; H04L 47/12; H04L 47/14; H04L 1/1874; H04L 47/32; H04L 1/0041; H04L 47/11; H04L 47/30; H04L 1/1835; H04L 47/41; H04W 80/06; H04W 28/02

See application file for complete search history.

(56) References Cited

U.S. PATENT DOCUMENTS

| | | |
|---|---|---|
| 6,901,593 B2 | 5/2005 | Aweya et al. |
| 7,085,236 B2 | 8/2006 | Oldak et al. |
| 7,336,672 B1 | 2/2008 | Aweya et al. |
| 7,830,793 B2 | 11/2010 | Gai et al. |
| 7,876,677 B2 | 1/2011 | Cheshire |
| 7,983,159 B2 | 7/2011 | Sun et al. |
| 8,238,361 B2 | 8/2012 | Carlsson |

(Continued)

FOREIGN PATENT DOCUMENTS

WO  2005/002155 A1  1/2005

OTHER PUBLICATIONS

RFC 2581 (Year: 1999).*

(Continued)

*Primary Examiner* — Faruk Hamza
*Assistant Examiner* — Aixa A Guadalupe Cruz
(74) *Attorney, Agent, or Firm* — Jefferson IP Law, LLP

(57) ABSTRACT

A method for managing a buffer by a base station in a wireless communication system is provided. The method includes calculating a transmission delay time that is an average of waiting time of packets transmitted for a predetermined time, identifying whether the calculated transmission delay time is greater than a preset delay time threshold value, and rearranging, if the transmission delay time is greater than the delay time threshold value, a transmission order of the packets in the buffer.

10 Claims, 10 Drawing Sheets

(56) References Cited

U.S. PATENT DOCUMENTS

| | | | |
|---|---|---|---|
| 8,964,539 B2 | 2/2015 | Susitaival et al. | |
| 2005/0094618 A1 | 5/2005 | Colban et al. | |
| 2005/0141419 A1 | 6/2005 | Bergamasco et al. | |
| 2006/0268708 A1 | 11/2006 | Speight et al. | |
| 2007/0042782 A1 | 2/2007 | Lee et al. | |
| 2009/0046626 A1 | 2/2009 | Shao et al. | |
| 2010/0027424 A1* | 2/2010 | Radunovic | H04L 45/127 370/238 |
| 2012/0140633 A1 | 6/2012 | Stanwood et al. | |
| 2013/0195050 A1 | 8/2013 | Lee et al. | |
| 2013/0308458 A1 | 11/2013 | Francini | |
| 2013/0322247 A1 | 12/2013 | Li et al. | |
| 2014/0286258 A1* | 9/2014 | Chowdhury | H04L 1/1812 370/329 |

OTHER PUBLICATIONS

Aweya et al., A control theoretic approach to active queue management, vol. 36, No. 2-3, pp. 203-235, Jul. 2001.

Aweya et al., An optimization-oriented view of random early detection, vol. 24, No. 12, pp. 1170-1187, Jul. 2001.

Floyd et al., Random Early Detection Gateways for Congestion Avoidance, IEEE/ACM Transactions on Networking, Aug. 1993, pp. 397-413, vol. 1 No. 4, IEEE.

Pan et al., Approximate Fairness through Differential Dropping, ACM SIGCOMM Computer Communications Review, 2003, pp. 23-39, vol. 33 No. 2.

Feng et al., Congestion Control Scheme Performance Analysis Based on Nonlinear RED, IEEE Systems Journal, 2014, vol. PP No. 99, IEEE.

Hu et al., HRED: A Simple and Efficient Active Queue Management Algorithm, IEEE ICCCN, 2004, pp. 387-393, IEEE.

Park et al., Analysis and Design of the Virtual Rate Control Algorithm for Stabilizing Queues in TCP Networks, Computer Networks, 2004, pp. 17-41, vol. 44 No. 1, Elsevier B.V.

Long et al., The Yellow Active Queue Management Algorithm, Computer Networks, 2005, pp. 525-550, vol. 47 No. 4, Elsevier B.V.

Singh et al., Variable Length Virtual Output Queue Based Fuzzy Congestion Control at Routers, IEEE ICCSN, 2011, pp. 29-33, IEEE.

Adams, Active Queue Management: A Survey, IEEE Communications Surveys & Tutorials, 2013, pp. 1425-1476, vol. 15 No. 3, IEEE.

Alasem et al., EF-AQM: Efficient and Fair Bandwidth Allocation AQM Scheme for Wireless Networks, 2010 Second International Conference on Computational Intelligence, Communications Systems and Networks, 2010, pp. 169-172, IEEE Computer Society.

Zhang et al., Oscillating Behavior of Network Traffic: A Case Study Simulation, Internetworking: Research and Experience, 1990, pp. 101-112, vol. 1, John Wiley & Sons, Ltd.

Alcaraz et al., Using Buffer Management in 3G Radio Bearers to Enhance End-to-End TCP Performance, Int. J. Wireless and Mobile Computing, 2009, pp. 177-188, vol. 3 No. 3.

Floyd et al., Adaptive RED: An Algorithm for Increasing the Robustness of RED's Active Queue Management, Aug. 1, 2001, pp. 1-12.

Feng et al., Techniques for Eliminating Packet Loss in Congested TCP/IP Networks, 1997, pp. 1-21.

Feng et al., A Self-Configuring RED Gateway, IEEE INFOCOM, 1999, pp. 1320-1328.

Jacobson et al., RED in a Different Light, Sep. 30, 1999, pp. 1-38.

May et al., Reasons Not to Deploy RED, IEEE IWQoS, Apr. 8, 1999, pp. 260-262.

Ott et al., SRED: Stabilized RED, IEEE INFOCOM, 1999, pp. 1346-1355.

Lapsley et al., Random Early Marking for Internet Congestion Control, Global Internet: Application and Technology, Global Telecommunications Conference—Globecom '99, 1999, pp. 1747-1752, IEEE.

Athuraliya et al., An Enhanced Random Early Marking Algorithm for Internet Flow Control, IEEE INFOCOM 2000, 2000, pp. 1425-1434, IEEE.

Hollot et al., On Designing Improved Controllers for AQM Routers Supporting TCP Flows, IEEE INFOCOM 2001, 2001, pp. 1726-1734, IEEE.

Kunniyur et al., Analysis and Design of an Adaptive Virtual Queue (AVQ) Algorithm for Active Queue Management, SIGCOMM '01, San Diego, California, USA, Aug. 27-31, 2001, pp. 123-134, ACM.

Zhang et al., RRED: Robust RED Algorithm to Counter Low-Rate Denial-of-Service Attacks, IEEE Communications Letters, May 2010, pp. 489-491, vol. 14 No. 5, IEEE.

Jun et al., A Cross-Layer Queue Management Algorithm in 802.16 Wireless Networks, 2009 International Conference on Communication Software and Networks, 2009, pp. 25-29, IEEE Computer Society.

Mahajan et al., Controlling High-Bandwidth Flows at the Congested Router, ICNP, 2001, pp. 192-201.

Feng et al., Stochastic Fair Blue: A Queue Management Algorithm for Enforcing Fairness, IEEE INFOCOM 2001, 2001, pp. 1520-1529, IEEE.

Kunniyur et al., An Adaptive Virtual Queue (AVQ) Algorithm for Active Queue Management, IEEE/ACM Transactions on Networking, Apr. 2004, pp. 286-299, vol. 12 No. 2, IEEE.

Lin et al., Dynamics of Random Early Detection, SIGCOMM '97, Cannes, France, 1997, pp. 127-137, ACM.

Pan et al., CHOKe—A Stateless Active Queue Management Scheme for Approximating Fair Bandwidth Allocation, IEEE INFOCOM 2000, 2000, pp. 942-951, IEEE.

Nichols et al., Controlling Queue Delay, Communications of the ACM, 2012, pp. 42-50, vol. 55 No. 7, ACM.

* cited by examiner

METHOD AND APPARATUS FOR MANAGING BUFFER IN WIRELESS COMMUNICATION SYSTEM

CROSS-REFERENCE TO RELATED APPLICATION(S)

This application claims the benefit under 35 U.S.C. § 119(a) of a Korean patent application filed on May 22, 2015 in the Korean Intellectual Property Office and assigned Serial number 10-2015-0072089, the entire disclosure of which is hereby incorporated by reference.

TECHNICAL FIELD

The present disclosure relates to a wireless communication system. More particularly, the present disclosure relates to a method and an apparatus for managing a buffer.

BACKGROUND

Generally, a mobile communication system has been developed to provide a voice service while securing activity of a user. However, the mobile communication system gradually extends an area from a voice service to a data service. At present, the mobile communication system has been developed to provide a high-speed data service. However, since the current mobile communication system that is providing services suffers from a resource shortage phenomenon and does not meet a user demand for higher-speed services, there is a need for a more developed mobile communication system.

Meanwhile, unlike a voice service, a data service determines resources, and the like, which may be allocated depending on the amount of data to be transmitted and a channel condition. Therefore, in a wireless communication system, such as the mobile communication system, a scheduler performs management, such as allocating a transmission resource based on the amount of resource to be transmitted, the channel condition, the amount of data, and the like. This is similarly performed even in long term evolution (LTE) which is one of the next-generation mobile communication systems and a scheduler located in a base station manages and allocates a radio transmission resource.

With the recent development of smart devices, such as a smart phone and a tablet personal computer (PC), a processing speed and capacity of traffic have been increased, and as a result a large-capacity buffer has been used. When a small-capacity buffer is used, the number of packets that may be stored in the buffer is small. The packets that are not stored in the buffer are highly likely to be lost.

On the other hand, when the large-capacity buffer is used, the number of packets on the network is increased, and therefore waiting time for packets to be transmitted to a terminal may be increased. For example, a delay time of packets is increased, and therefore a user's quality of experience may be reduced.

For example, when the capacity of the buffer is increased beyond an appropriate level, a transmission delay time is increased and therefore the user's quality of experience may be reduced, but the processing speed and the capacity of traffic are increased and therefore a larger-capacity buffer may be required. Due to the conflicting demand, there is a need for a method and an apparatus for managing a buffer.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for solving a transmission delay of packets without a loss of packets by rearranging a transmission order of packets in a buffer when the transmission delay of packets occurs due to the increase in the number of packets stored in the buffer in a wireless communication system.

In accordance with an aspect of the present disclosure, a method for managing a buffer in a wireless communication system is provided. The method includes calculating a transmission delay time that is an average of waiting time of packets transmitted for a predetermined time, identifying whether the calculated transmission delay time is greater than a preset delay time threshold value, and rearranging, if the transmission delay time is greater than the delay time threshold value, a transmission order of the packets in the buffer.

In accordance with another aspect of the present disclosure, a base station for managing a buffer in a wireless communication system is provided. The base station includes a transceiver configured to transmit and receive a signal and a controller configured to calculate a transmission delay time that is an average of waiting time of packets transmitted for a predetermined time, identify whether the calculated transmission delay time is greater than a preset delay time threshold value, and rearrange, if the transmission delay time is greater than the delay time threshold value, a transmission order of the packets in the buffer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
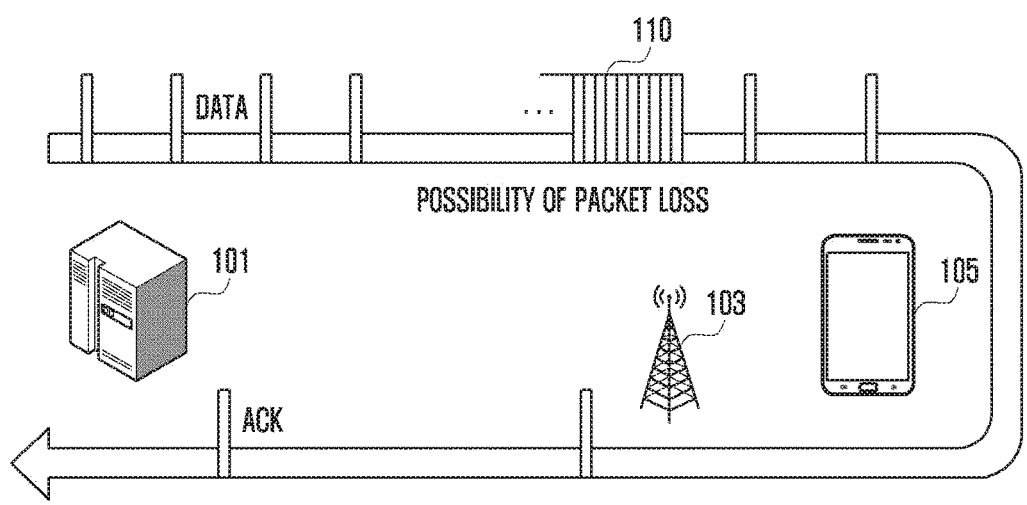
FIG. 1A is a diagram illustrating a process of transmitting, by a server, packets to a terminal through a base station including a small-capacity buffer according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. In addition, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components are exaggerated, omitted, or schematically illustrated in the accompanying drawings. Further, the size of each component does not exactly reflect its real size. In each drawing, the same or corresponding components are denoted by the same reference numerals.

In this case, it may be understood that each block of processing flow charts and combinations of the flow charts may be performed by computer program instructions. Since these computer program instructions may be installed in processors of a general computer, a special computer, or other programmable data processing apparatuses, these computer program instructions executed through the process of the computer or the other programmable data processing apparatuses create means performing functions described in block(s) of the flow chart. Since these computer program instructions may also be stored in a computer usable memory or a computer readable memory or other programmable data processing apparatuses that may direct a computer or other programmable data processing apparatuses in order to implement functions in a specific scheme, the computer program instructions stored in the computer usable memory or the computer readable memory may also produce manufacturing articles including instruction means performing the functions described in the block(s) of the flow chart. Since the computer program instructions may also be installed in a computer or other programmable data processing apparatuses, they perform a series of operation operations on the computer or the other programmable data processing apparatuses to create processes executed by the computer, such that the computer program instructions executing the computer or the other programmable data processing apparatuses may also provide operations for performing the functions described in the block(s) of the flow chart.

In addition, each block may indicate some of modules, segments, or codes including one or more executable instructions for executing a specified logical function(s). Further, it is to be noted that functions mentioned in the blocks may be performed regardless of a sequence in some alternative embodiments. For example, two blocks that are shown in succession may be simultaneously performed in fact or may be sometimes performed in a reverse sequence depending on corresponding functions.

Here, the term '-unit' used in the present embodiment means software or hardware components, such as field programmable gate array (FPGA) and application specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, as one example, the '~unit' includes components, such as software components, object oriented software components, class components, and task components and includes processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more central processing units (CPUs) within a device or a security multimedia card.

FIG. 1A is a diagram illustrating a process of transmitting, by a server, packets to a terminal through a base station including a small-capacity buffer according to an embodiment of the present disclosure.

Referring to FIG. 1A, a server 101 may transmit packets to a base station 103. Further, the base station 103 receiving packets from the server 101 may transmit the received packets to a terminal 105.

When the terminal 105 receives the packets, the terminal 105 may transmit acknowledge (ACK) signals for the packets to the base station 103. Further, the base station may transmit the received ACK signals to the server and the server receiving the ACK signals may transmit the subsequent packet to the base station depending on the information included in the ACK signals.

In this case, when the capacity of a buffer 110 included in the base station 103 is small, the number of packets that may be stored in the buffer is small, and therefore the packets received from the server 101 may be lost without being stored in the buffer. Therefore, when packets are lost, the server needs to retransmit the packets. As the number of packets transmitted is increased, the lost packets are increased, such that the user's quality of experience may be reduced.

For example, when a user watches video using a terminal, if capacity of the buffer is small, a breaking phenomenon continuously occurs due to the packets not stored in the buffer among the packets received from the server, and as a result the user's quality of experience may be reduced.

Figure 1B:
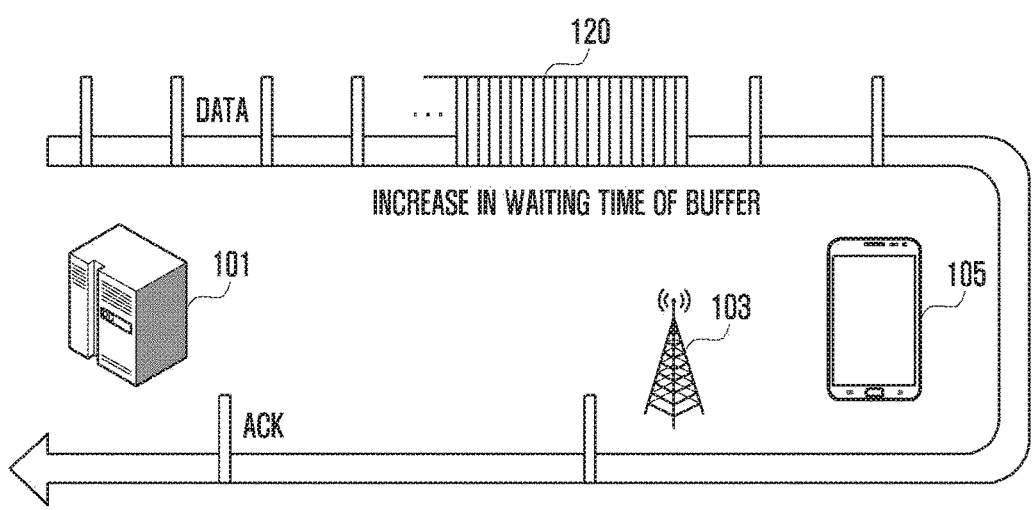
FIG. 1B is a diagram illustrating a process of transmitting, by a server, packets to a terminal through a base station including a large-capacity buffer according to an embodiment of the present disclosure.

FIG. 1B is a diagram illustrating a process of transmitting, by a server, packets to a terminal through a base station including a large-capacity buffer according to an embodiment of the present disclosure.

Referring to FIG. 1B, a server 101 may transmit packets to the base station 103. The base station 103 receiving packets from the server 101 may transmit the received packets to the terminal 105.

When the terminal 105 receives packets, the terminal 105 may transmit the ACK signals for the received packets to the base station 103. Further, the base station may transmit the received ACK signals to the server and the server receiving the ACK signals may transmit the subsequent packet to the base station.

In this case, the greater the capacity of a buffer 120 included in the base station 103, the greater the number of packets that may be stored in the buffer, and therefore the packets received from the server 101 may be sufficiently stored in the buffer. However, if the number of packets stored in the buffer is increased, the waiting number of packets may be increased and the waiting time (hereinafter, referred to as transmission delay time) for packets to be transmitted to the terminal may be increased.

As the transmission delay time of packets is increased, it takes the terminal much time to receive packets, and as a result the user's quality of experience may be reduced. Further, as described above, as the transmission delay time of packets is increased, the retransmission for the loss of packets is delayed as well, such that it may be vulnerable to the loss of packets.

For example, when the capacity of the buffer is increased beyond an appropriate level, a transmission delay time is increased and therefore the user's quality of experience may be reduced, but the processing speed and the capacity of traffic is increased and therefore a larger-capacity buffer may be required. Due to the conflicting demand, there is a need for a method and an apparatus for managing a buffer.

Figure 2:
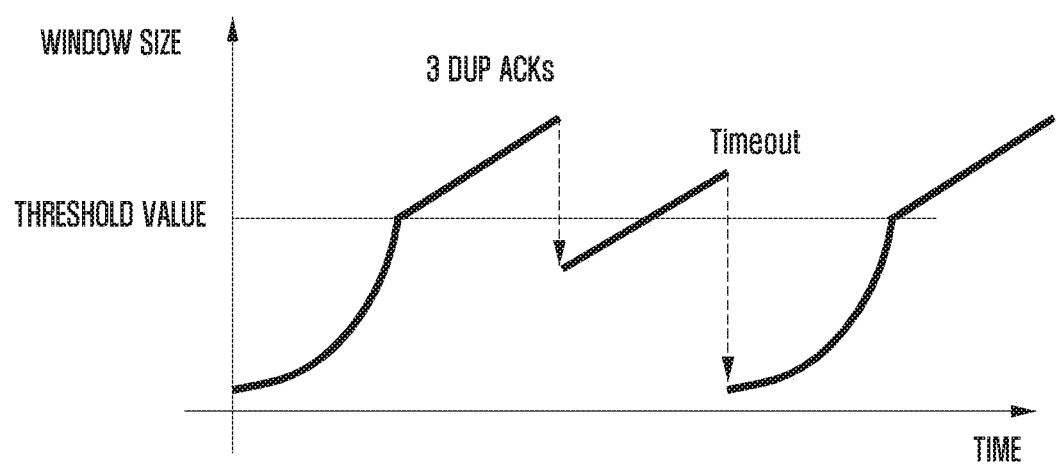
FIG. 2 is a diagram illustrating a change in a window size when packets are transmitted and received using a transmission control protocol (TCP) according to an embodiment of the present disclosure.

FIG. 2 is a diagram illustrating a change in a window size when packets are transmitted and received using a transmission control protocol (TCP) according to an embodiment of the present disclosure.

Referring to FIG. 2, the window size may mean the number of packets that a transmitter may maximally transmit without receiving the ACK signal.

When the transmitter transmits and receives packets using the TCP protocol, the receiver receives packets and then transmits the ACK signals for the packets to secure transmission reliability of the packets. The ACK signal transmitted by the receiver may include information (hereinafter, referred to as packet identification information) that may identify packets to be transmitted subsequent to the received packets. Therefore, the transmitter receiving the ACK signal may transmit packets corresponding to packet identification information included in the ACK signal.

In this case, the transmitter may perform the retransmission of packets when it does not receive the ACK signal until the time stored in a timer included in the transmitter exceeds.

Alternatively, when the receiver does not receive packets, the receiver may transmit the ACK signal including the packet identification information on the packets not received to the transmitter. In this case, when receiving the ACK signal including the packet identification information certain times or more, the transmitter may retransmit packets corresponding to the packet identification information.

The certain times may be stored while being set to be three times. For example, when continuously receiving the ACK signal including the same packet identification information three times or more, the transmitter may retransmit the packets corresponding to the packet identification information included in the ACK signal. Further, the ACK signal including the same packet identification information continuously transmitted the certain times or more may be mixed with the term duplicate ACK (DUP ACK). The certain times may be predetermined or configured by the receiver or the transmitter.

When not receiving packets, the receiver may transmit the ACK signal including the same identification information to the transmitter through the following processes.

For example, assume that packet No. 2 among packet Nos. 1, 2, 3, 4, and 5 is lost. The receiver receives packet Nos. 1, 3, 4, and 5, and therefore includes identification information on the packet No. 2 in an ACK signal for packet No. 1. On the other hand, the receiver does not receive the packet No. 2, and therefore may transmit ACK signals for packet Nos. 3, 4, and 5 including the identification information on the packet No. 2.

Therefore, the transmitter continuously receives the ACK signal including the identification information on the packet No. 2 three times, and therefore may retransmit the packet No. 2 corresponding to the packet identification information included in the ACK signal to the base station. Further, as can be appreciated from the graph of FIG. 2, when receiving the DUP ACK, the transmitter may reduce the window size. The detailed contents will be described below.

The change in the window size will be described with reference to FIG. 2. FIG. 2 illustrates the change in the window over time.

As described above, if the transmitter transmits packets, the receiver may transmit the ACK signals for the packets to the base station. Further, the base station receiving the ACK signals may transmit the ACK signals to the transmitter.

The transmitter may receive the ACK signals and then increase the window size and may transmit the packet corresponding to the increased window size to the base station. In this case, a ratio of increasing the window size by the transmitter may be set in advance.

For example, the transmitter may increase the window size twice by twice before the window size exceeds a threshold value. Therefore, when transmitting one packet and receiving the ACK signal for the packet, the transmitter may increase the window size twice to transmit two packets to the base station. Further, when receiving the ACK for the packet, the transmitter may again increase the window size twice to transmit four packets. As such, the transmitter may increase the window size whenever it receives the ACK signal and transmit a greater number of packets at a time.

Further, when the window size exceeds the threshold value, the transmitter may linearly increase the window size to increase the number of packets that may be transmitted at a time.

When the loss of packets is detected, the transmitter increasing the window size may reduce the window size. For example, when the loss of packets is detected, the transmitter may determine that the number of packets on the network to reduce the window size is many. In this case, the ratio of reducing the window size may be set in advance. For example, the transmitter may reduce the window size to be half.

In this case, the transmitter may use the foregoing method to detect the loss of packets. For example, when continuously receiving the ACK signal including the same packet identification information by a preset number, the transmitter may detect that the packet corresponding to the packet identification information included in the ACK signal is lost. Alternatively, when not receiving the ACK signal for the time stored in the timer, the transmitter may detect that the packet is lost.

Therefore, the transmitter detecting the loss of packets determines that the number of packets on the network is many and may reduce the window size to reduce the number of packets on the network. More particularly, the transmitter reduces the window size and thus the number of packets that may be transmitted without receiving the ACK, such that the number of packets on the network may be reduced.

Further, even when the loss of packets does not occur, the transmitter may reduce the window size if it is determined that the number of packets on the network is many and thus the transmission delay time is increased, thereby reducing the number of packets on the network.

However, to reduce the window size, the transmitter needs to continuously reduce the ACK signal including the same packet identification information as much as a preset number. There is a problem that the ACK signal is a signal transmitted when the packets are lost.

The present disclosure proposes to solve the foregoing problem and is to provide a method and an apparatus for efficiently reducing transmission delay time without a loss of packets.

Figure 3:
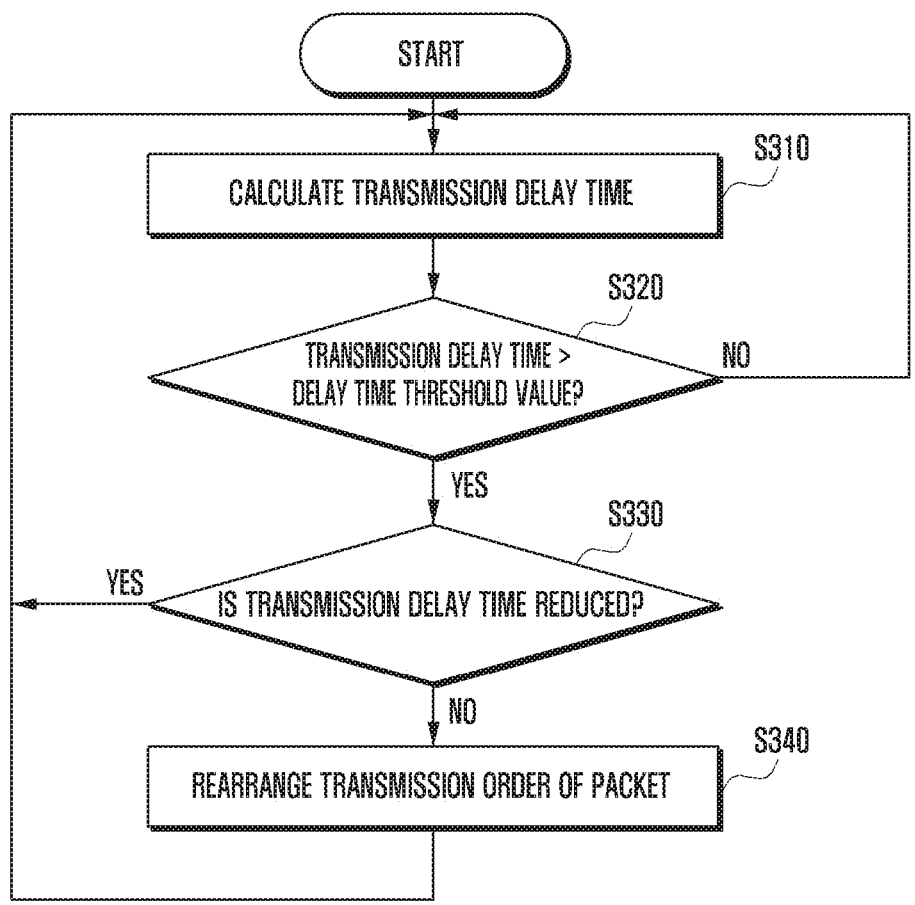
FIG. 3 is a flowchart illustrating a method for managing, by a base station, a buffer according to an embodiment of the present disclosure.

FIG. 3 is a flowchart illustrating a method for managing, by a base station, a buffer according to an embodiment of the present disclosure.

Referring to FIG. 3, the base station calculates the transmission delay time in operation S310. To calculate the transmission delay time, the base station may calculate an average of the waiting time of all the packets transmitted for a certain time. The certain times may be predetermined or configured by the base station or the terminal.

In operation S320, the base station calculating the transmission delay time determines whether the calculated transmission time exceeds the threshold value of the delay time. The delay time threshold value may mean the delay time at which the user does not feel that the quality of experience is reduced. Further, the delay time threshold value may be pre-stored in the base station.

If it is determined that the calculated transmission delay time does not exceed the delay time threshold value, the base station may transmit the packets received from the server to the terminal in the received order and return to the operation S310 to calculate the transmission delay time in a subsequent section.

On the other hand, if it is determined that the calculated transmission delay time exceeds the delay time threshold value, the base station may determine that the user quality of experience may be reduced because the number of packets on the network is many and therefore the transmission delay time is increased.

Therefore, if it is determined that the calculated transmission delay time exceeds the delay time threshold value, in operation S330, the base station may determine whether the transmission delay time is reduced.

The reason why the base station determines whether the transmission delay time is reduced is to identify whether the server reduces the window size in the previous operation. If it is determined that the transmission delay time is reduced, the base station determines that the window size is reduced and returns to the operation S310 to calculate the transmission delay time in the subsequent section.

If it is determined that the transmission delay time is not reduced, the base station rearranges the transmission order of packets in operation S340 to reduce the number of packets on the network.

The process of rearranging by the base station, the transmission order of packets may include moving a packet to be first transmitted to a certain position stored in the base station. The certain position may include a position to which an N-th packet will be transmitted. The certain position may be determined depending on the number of DUP ACK signals to be received by the server to reduce the window size. The certain position may be predetermined or configured by the base station or the terminal According to an embodiment of the present disclosure, the number of DUP ACK signals may be preferably set to be three. Therefore, the base station may move the packet to be first transmitted to a position to which a fourth packet will be transmitted so as to transmit three DUP ACK signals.

For example, the packet to be first transmitted is called packet No. 0 and packets to be transmitted later are each called packet No. 1, packet No. 2, packet No. 3, packet No. 4 . . . In this case, in operation S340, the base station may move the packet No. 0 after the packet No. 3 that is the position to which the fourth packet will be transmitted.

Since the transmission order of packets is rearranged, the base station may transmit the packet No. 1 instead of the packet No. 0. Since the terminal does not receive the packet No. 0 in turn at which the packet No. 0 needs to be received, the terminal is similarly operated to the case in which the packet No. 0 is lost. For example, the terminal may transmit the ACK signal for the packet that includes the identification information on the packet No. 0. Similarly, even when receiving the packet No. 2, the terminal may transmit an ACK signal including the identification information on the packet No. 0 and even when receiving the packet No. 3, the terminal may transmit an ACK signal including the identification information on the packet No. 0.

Therefore, the server may continuously receive the ACK signal including the identification information on the packet No. 0 three times and receive the DUP ACK signal to reduce the window size.

Meanwhile, since the packet No. 0 is positioned after the packet No. 3, the base station may transmit the packet No. 3 and then transmit the packet No. 0. Further, the base station may transmit the packet No. 0 and then sequentially transmit the packet Nos. 4 and 5 that are the subsequent packets.

Therefore, the terminal may transmit the DUP ACK signal to the server while receiving all the packets without the loss of packets and the server may reduce the window size without the loss of packets.

However, when a plurality of sessions are present between the server and the terminal, the server may not receive the DUP ACK signal even when the base station rearranges and transmits the packets and the window size may not be reduced. Therefore, in this case, the transmission delay time is not reduced. However, the base station may not identify whether the server reduces the window size.

Therefore, the base station may return to the operation S310 to calculate the transmission delay time in the subsequent section. Further, in the operation S320, the base station may determine whether the transmission delay time exceeds the delay time threshold value.

The base station may determine whether the window size is reduced based on whether the transmission delay time is reduced in the operation S330.

If it is determined that the transmission delay time is reduced in the subsequent section in the operation S330, the base station may determine that the window size is reduced by the rearrangement of the transmission order of packets in the previous section and may return to the operation S310.

On the other hand, if it is determined in operation S330 that the transmission delay time is not reduced, the base station may determine that the window size is not reduced despite the rearrangement of the transmission order of packets in the previous section. For example, the base station may be determined that the window size is not reduced since the plurality of sessions are present between the server and the base station.

Therefore, if it is determined that the transmission delay time is not reduced, the base station may again arrange the transmission order of packets in the operation S340. In this case, to move the packet to be first transmitted that is stored in the base station, the base station may determine a position to which the packet will be moved based on the certain position. More particularly, when the certain position is a position to which the N-th packet will be transmitted, the base station may position the packet to be first transmitted at a position to which a packet corresponding to an integer multiple of N will be transmitted. The certain position may be predetermined or configured by the base station or the terminal For example, in the operation of first rearranging the transmission order of packets, when the base station moves the packet to be first transmitted to the position to which the fourth packet will be transmitted, the base station may move the packet to be first transmitted in the rearrangement process of the subsequent section to a position to which an eighth packet will be transmitted.

The base station may again identify whether the transmission delay time is reduced in the subsequent section in the operation S330. In this case, when the transmission delay time is reduced, it may be determined that the window size is reduced.

However, when a plurality of sessions are present between the server and the terminal, the transmission delay time may not be reduced and the base station may increase a moving interval of packets until the transmission delay time is reduced to rearrange the transmission order of packets.

Figure 4:
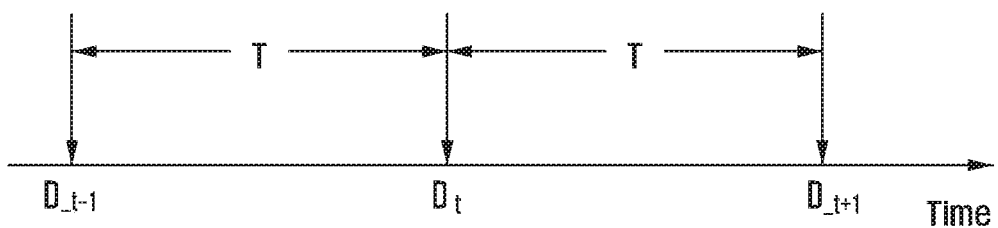
FIG. 4 is a diagram illustrating a method for calculating a transmission delay time according to an embodiment of the present disclosure.

FIG. 4 is a diagram illustrating a method for calculating a transmission delay time in according to an embodiment of the present disclosure.

Referring to FIG. 4, to calculate the transmission delay time, the base station may calculate an average of the waiting time of all the packets transmitted for time T that is a section between Dt-1 and Dt. In this case, the section T for calculating the transmission delay time may be pre-stored in the base station. Further, the base station may calculate the transmission delay time even in the section T between Dt and Dt+1 that is a section after the Dt. For example, the base station may continuously calculate the transmission delay time.

The base station may determine the number of packets stored in the buffer based on the calculated delay time. When the transmission delay time exceeds the transmission delay threshold value pre-stored in the base station, the base station may determine that the number of packets on the network is many to rearrange the transmission order of packets, thereby reducing the window size. On the other hand, when the transmission delay time is less than the transmission delay threshold value, the base station may determine that the number of packets on the network is not many and transmit the packets received from the server to the terminal in the received order.

Further, the base station may determine whether the window size is changed based on the change in the transmission delay time. When receiving the ACK signal including the same packet identification information over a certain frequency, the server may reduce the window size. However, the base station may not identify whether the server reduces the window size.

Therefore, the base station may determine whether the window size is changed based on the change in the transmission delay time. When the transmission delay time is reduced, the base station may determine that the window size is sufficiently reduced. On the other hand, when the transmission delay time is not reduced, the base station may determine that the window size is not reduced because the number of sessions connected between the terminal and the server is many. Therefore, the base station may increase the moving interval of packets to rearrange the transmission order of packets again, thereby reducing the window size.

Figure 5:
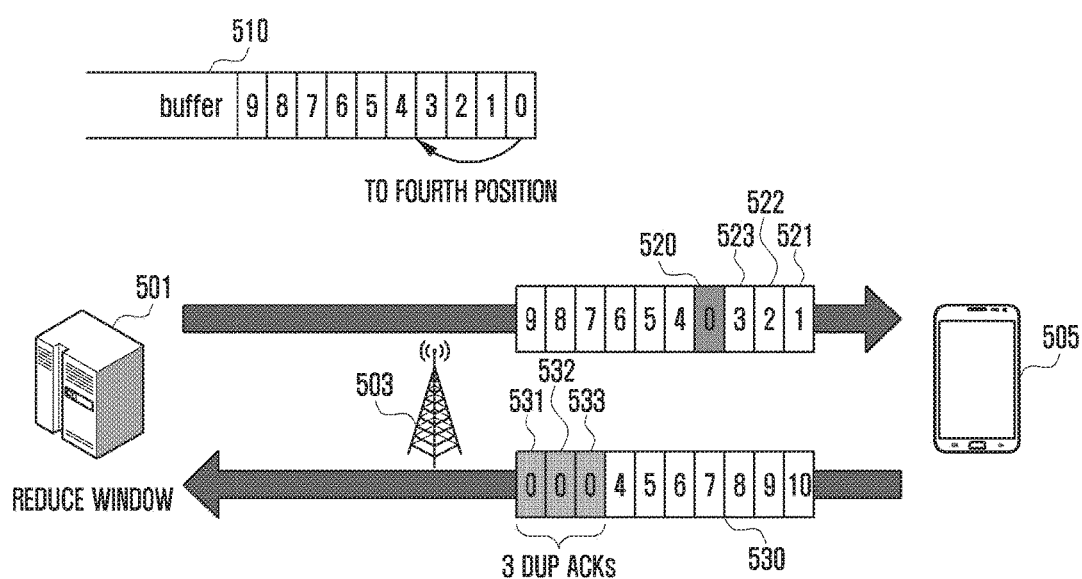
FIG. 5 is a diagram illustrating a process of rearranging, by a base station, a transmission order of packets stored in a buffer according to an embodiment of the present disclosure.

FIG. 5 is a diagram illustrating a process of rearranging, by a base station, a transmission order of packets stored in a buffer according to an embodiment of the present disclosure.

Referring to FIG. 5, if it is determined that the transmission delay time exceeds the pre-stored delay time threshold value and the transmission delay time is not reduced, the base station needs to reduce the window size for packet transmission. For this purpose, a base station 503 changes the transmission order of packets.

The base station 503 may move the packet No. 0 that is a packet to be first transmitted to a certain position. The certain position may be determined depending on the number of DUP ACK signals to be received by the transmitter to reduce the window size. According to an embodiment of the present disclosure, the number of DUP ACK signals to be received by the transmitter may be preferably set to be 3, such that the certain position may be determined as the position to which the fourth packet will be transmitted. The certain position may be predetermined or configured by the base station or the terminal According to an embodiment of the present disclosure, the base station may move the packet No. 0 after the packet No. 3 that is the position to which the fourth packet will be transmitted. The reason why the packet No. 0 moves after the packet No. 3 is that a server 501 may reduce the window size when receiving three continuous ACK signals including the same packet identification information. The base station moves the packet No. 0 to the position to which the fourth packet will be transmitted, such that the base station 520 may transmit arranged packets like 520 to the terminal.

The terminal receiving the packets transmitted before the packet No. 0 transmits the ACK signal including the identification information on the packet No. 0. Therefore, the terminal needs to receive the packet No. 0 later. However, the terminal 505 may receive packet No. 1 521 instead of the packet No. 0.

The terminal that does not receive the packet No. 0 may transmit the ACK signal for the packet No. 1 that includes identification information 531 on the packet No. 0. Further, the terminal may continuously receive packet No. 2 522 and packet No. 3 523 and may transmit even ACK signals for the packet No. 2 522 and the packet No. 3 packet 523 that include identification information 532 and 533 on the packet No. 0. The ACK signal transmitted by the terminal is like 530.

Therefore, the server may continuously receive three ACK signals including the identification information on the packet No. 0 and determines that the packet is lost to reduce the window size.

Meanwhile, since the packet No. 0 is positioned after the packet No. 3, the base station may transmit the packet No. 3 and then transmit the packet No. 0. Further, the base station may transmit the packet No. 0 and then sequentially transmit the packet Nos. 4, 5, and 6.

Further, the terminal may receive the packet No. 0 and then sequentially receive the packet Nos. 4, 5, and 6. Further, the terminal may receive the packet No. 0 and then transmit the ACK signal for the packet No. 0 including the identification information on the packet No. 4, and thus may receive the packet No. 4. As a result, the server may reduce the window size without the loss of packets.

By the foregoing manner, the base station rearranges the transmission order of packets, such that the terminal may transmit the DUP ACK signal to the server without the loss of packets and the server may reduce the window size without the loss of packets, thereby controlling the number of packets on the network.

Figure 6:
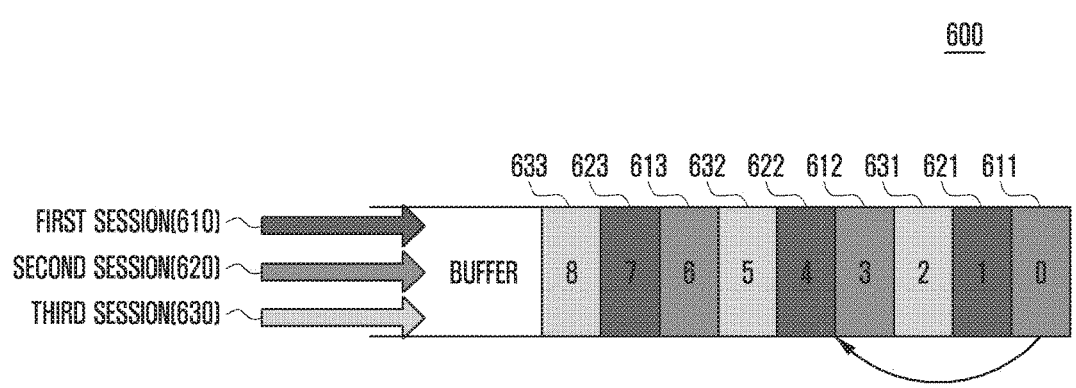
FIG. 6 is a diagram illustrating a process of determining whether a plurality of sessions are present according to an embodiment of the present disclosure.

FIG. 6 is a diagram illustrating a process of determining whether a plurality of sessions are present according to an embodiment of the present disclosure.

Referring to FIG. 6, it is assumed that three sessions 610, 620, and 630 are present between the server and the terminal. In this case, each session is called a first session 610, a second session 620, and a third session 630.

In this case, packets generated in each session may be mixed and stored in a buffer 600 of the base station. Referring to FIG. 6, packets 611, 612, and 613 generated in the first session, packets 621, 622, and 623 generated in the second session, and packets 631, 632, and 633 generated in the third session are mixed and stored in the buffer 600 of the base station.

Therefore, when a plurality of sessions are present, the ACK signal including the same packet information is not continuously generated even when the transmission order of packets are rearranged as illustrated in FIG. 6.

For example, even when the packet No. 0 moves after the packet No. 3 as illustrated in FIG. 6, the packet of the first session includes only one packet No. 3, and therefore the ACK signal including the identification information on the packet No. 0 is generated once. Therefore, even when the base station rearranges the transmission order of packets as illustrated in FIG. 6, the server does not receive the ACK signal including the identification information on the packet No. 0 as many as a preset number, and as a result the server does not reduce the window size.

Further, the base station may not appreciate how many sessions are present between the server and the terminal. Therefore, the base station may rearrange the transmission order of packets and then use the transmission delay time calculated in the subsequent section to determine whether the window size is reduced and rearrange the transmission order of packets in the subsequent section if it is determined that the window size is not reduced.

More particularly, the base station rearranges the transmission order of packets and then identifies the change in the transmission delay time of packets in the subsequent section. If only one session is present, the window size is reduced due to the rearrangement of transmission order of packets, and as a result the transmission delay time of packets in the subsequent section is reduced.

Therefore, if it is determined that the transmission delay time in the subsequent section is reduced, the base station performs a procedure of transmitting packets to a terminal in the received order of packets.

On the other hand, when the delay time is not reduced, the base station determines that the number of sessions between he server and the terminal is present in plural. Therefore, the base station increases the moving interval of the packet No. 0 in the subsequent section to rearrange the transmission order of packets, thereby reducing the window size. In this case, when the transmission order of packets is first rearranged, the information on the position to which the packet to be first transmitted moves may be pre-stored in the base station and the base station uses the information to determine positions to which packets will move. For example, when the transmission order of packets is first rearranged, if the position to which the packet to be first transmitted will move is the position to which the N-th packet will be transmitted, the base station may move the packet No. 0 to the position to which the packet corresponding to the integer multiple of N will be transmitted.

For example, when the base station first rearranges the transmission order of packets, if the packet No. 0 moves to the position to which the fourth packet will be transmitted, the base station moves the packet No. 0 to the position to which the fourth packet will be transmitted and then identifies whether the transmission delay time is reduced in the subsequent section.

When the transmission delay time is not reduced, the base station may move the packet to be first transmitted to the position to which the eighth packet will be transmitted. The base station may identify whether the transmission delay time is reduced in the subsequent section and if the transmission delay time is not reduced, the base station may sequentially move the packet No. 0 to a position to which a twelfth packet will be transmitted and a position to which a sixteenth packet will be transmitted.

Figure 7:
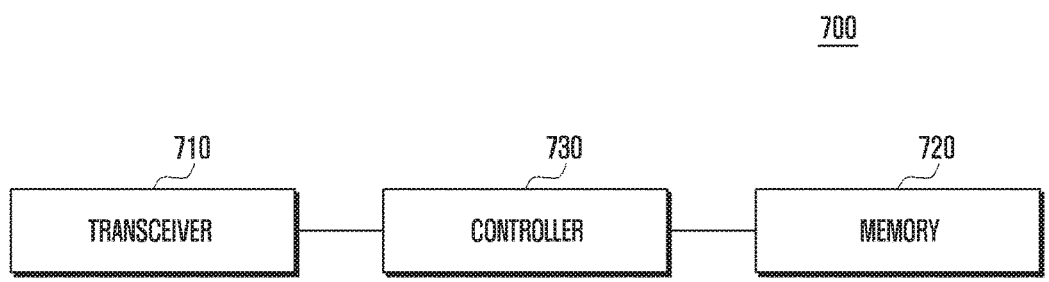
FIG. 7 is a diagram illustrating a configuration of a base station according to an embodiment of the present disclosure.

FIG. 7 is a diagram illustrating a configuration of a base station according to an embodiment of the present disclosure.

Referring to FIG. 7, a base station 700 of the present disclosure may be configured to include a transceiver 710, a memory 720, and a controller 730.

The transceiver 710 may perform communication with other network entities. The transceiver 710 may receive packets from the server and transmit the packets received from the server to the terminal.

Further, the transceiver 710 may receive the ACK signal transmitted from the terminal and transmit the received ACK signal to the server.

The memory 720 may store the packets received from the base station. Further, the memory 720 may store the information required to rearrange the transmission order of packets. Further, the memory 720 may store the delay time threshold value to compare with the calculated transmission delay time.

The controller 730 may control the packets received from the server to be stored in the buffer included in the base station.

Further, the controller 730 may calculate the average of the waiting time of packets for a certain time to calculate the transmission delay time of packets. Further, the controller 730 may compare the calculated transmission delay time with the delay time threshold value stored in the memory 720 to determine whether the number of packets on the network is many.

Further, the controller 730 may identify whether the transmission delay time is reduced to identify whether the window size is reduced in the previous section.

When the transmission delay time is reduced, the controller 730 may determine that the window size is reduced. On the other hand, when the transmission delay time is not reduced, it may be determined that the transmission order of packets needs to be rearranged.

Further, if the transmission delay time is not reduced even when the transmission order of packets is rearranged in the previous section, the controller 730 may determine that the number of sessions between the server and the terminal is present in plural.

Further, if the transmission order of packets needs to be rearranged, the controller 730 may use the information required to rearrange the transmission order of packets stored in the memory 720 to rearrange the transmission order of packets. In this case, the information required to rearrange the transmission order of packets may be information on which of the packets moves to which of the positions. According to an embodiment of the present disclosure, the information may include information to move the packet to be first transmitted to the position to which the fourth packet will be transmitted.

In this case, the information required to rearrange the transmission order of packets may be determined depending on the number of ACKs including the same packet identification information to be received for the server to reduce the window size and stored. According to an embodiment of the present disclosure, the number of ACKs may be set to be three.

Figure 8:
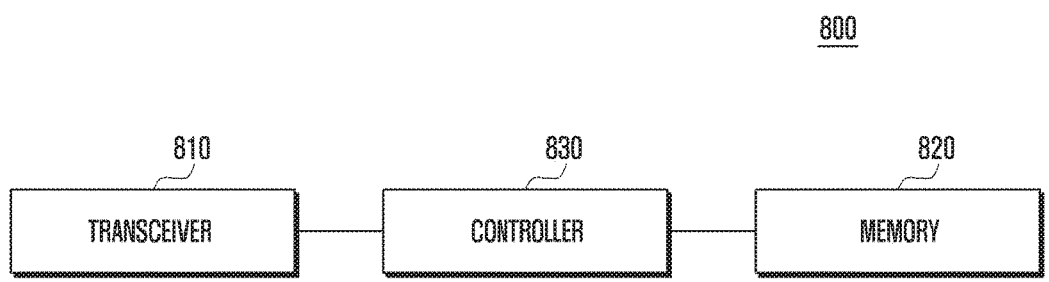
FIG. 8 is a diagram illustrating a configuration of a server according to an embodiment of the present disclosure.

FIG. 8 is a diagram illustrating a configuration of a server according to an embodiment of the present disclosure.

Referring to FIG. 8, a base station 800 of the present disclosure may be configured to include a transceiver 810, a memory 820, and a controller 830.

The transceiver 810 may perform communication with other network entities. The transceiver 810 may transmit packets to the base station. Further, the transceiver 810 may receive the ACK signal transmitted from the terminal through the base station.

The memory 820 may store the threshold value of the window size. Therefore, when the window size exceeds the threshold value of the window size stored in the memory, the server 800 may control an increase range of the window size. Further, the memory 820 may store the information required to increase the window size. Further, the memory 820 may store the information required to reduce the window size when the packets are lost.

When receiving the ACK signal from the terminal, the controller 830 may transmit the packet corresponding to the packet identification information included in the ACK signal to the base station. Further, the controller 830 may increase the window size whenever it receives the ACK signal from the terminal. In this case, the controller may compare the current window size with the threshold value of the window size to control the increase range of the window size.

Further, the controller 830 may control the number of packets to be transmitted depending on the increased window size to transmit packets to the base station.

Further, when continuously receiving the ACK signal including the same packet identification information from the terminal as many as a preset number, the controller 830 may reduce the window size. According to an embodiment of the present disclosure, the preset number may be preferably set to be three and when continuously receiving three ACK signals including the same packet identification information, the controller 830 may reduce the window size.

Figure 9:
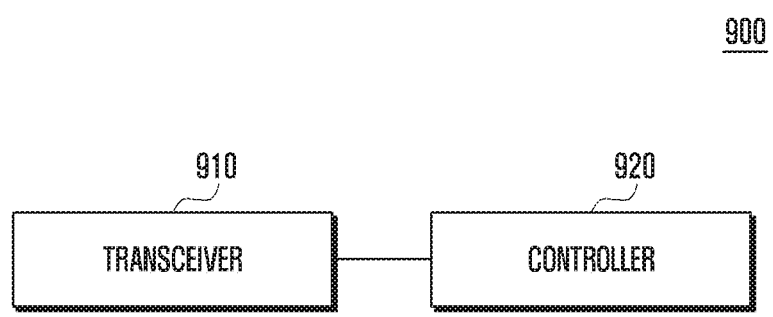
FIG. 9 is a diagram illustrating a configuration of a terminal according to an embodiment of the present disclosure.

FIG. 9 is a diagram illustrating a configuration of a terminal according to an embodiment of the present disclosure.

Referring to FIG. 9, a terminal 900 of the present disclosure may be configured to include a transceiver 910 and a controller 920.

The transceiver 910 may perform communication with other network entities. The transceiver 910 may receive packets from the base station and transmit the ACK signals for the packets to the base station.

The controller 920 may receive the packets from the base station. In this case, when receiving the packets from the base station, the controller 920 may generate and transmit the ACK signals for the received packets.

The controller 920 may transmit the ACK signal including identification information on the subsequent packet.

Further, when not receiving a specific packet, the controller 920 may transmit ACK signals for other received packets that include the identification information on the packets that are not received.

For example, when the packet No. 1 instead of the packet No. 0 is received, the controller may transmit the ACK signal for the packet No. 1 including the identification information on the packet No. 0. Further, even when receiving the packets Nos. 2 and 3, the controller 920 may transmit the ACK signals for the packets Nos. 2 and 3 including the identification information on the packet No. 0.

According to the various embodiments of the present disclosure, it is possible to effectively solving the transmission delay of packets without the loss of packets by rearranging the transmission order of packets in the buffer when the transmission delay of packets occurs.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a base station, the method comprising:
   calculating a transmission delay time that is an average of waiting time of packets transmitted for a certain time;
   identifying whether the transmission delay time is greater than a preset delay time threshold value; and
   rearranging, based on the transmission delay time being greater than the preset delay time threshold value, a transmission order of packets to be transmitted in a buffer to decrease a window size for a packet transmission, by moving a packet to be first transmitted to a certain position;
   determining whether the transmission delay time is reduced; and
   rearranging, based on the transmission delay time being not reduced, the transmission order of the packets to be transmitted,
   wherein the transmission order of the packets to be transmitted is determined based on a number of duplication acknowledge (DUP ACK)s for decreasing the window size, the DUP ACKs including same packet identification information.

2. The method of claim 1,
wherein the window size indicates a maximum amount of packets that can be transmitted without receiving an acknowledge (ACK) signal.

3. The method of claim 2, wherein the certain position comprises a position to which a fourth packet is transmitted, if the number of DUP ACKs is 3.

4. The method of claim 2, further comprising:
receiving packets corresponding to the window size determined based on a movement of the packet to be first transmitted.

5. The method of claim 4, wherein the window size is determined to be a half of a previous window size based on the DUP ACKs including the same packet identification information being received.

6. A base station, the base station comprising:
a transceiver; and
a controller configured to:
   calculate a transmission delay time that is an average of a waiting time of packets transmitted for a certain time,
   identify whether the transmission delay time is greater than a preset delay time threshold value, and
   rearrange, based on the transmission delay time being greater than the preset delay time threshold value, a transmission order of packets to be transmitted in a buffer to decrease a window size for a packet transmission, by moving a packet to be first transmitted to a certain position,
   determine whether the transmission delay time is reduced; and
   rearrange, based on the transmission delay time being not reduced, the transmission order of the packets to be transmitted,
   wherein the transmission order of the packets to be transmitted is determined based on a number of duplication acknowledge (DUP ACK)s for decreasing the window size, the DUP ACKs including same packet identification information.

7. The base station of claim 6,
wherein the window size indicates a maximum amount of packets that can be transmitted without receiving an acknowledge (ACK) signal.

8. The base station of claim 7, wherein the certain position comprises a position to which a fourth packet is transmitted, if the number of DUP ACKs is 3.

9. The base station of claim 7, wherein the controller is further configured to receive packets corresponding to the window size determined based on a movement of the packet to be first transmitted.

10. The base station of claim 9, wherein the window size is determined to be a half of a previous window size based on the DUP ACKs including the same packet identification information being received.

* * * * *